United States Patent [19]

Ichinoi et al.

[11] Patent Number: 4,641,201
[45] Date of Patent: Feb. 3, 1987

[54] COLOR VIDEO SIGNAL TRANSMITTING APPARATUS

[75] Inventors: Yutaka Ichinoi, Yokohama; Naomichi Nishimoto, Tachikawa, both of Japan

[73] Assignee: Victor Company of Japan, Ltd., Japan

[21] Appl. No.: 590,077

[22] Filed: Mar. 15, 1984

[30] Foreign Application Priority Data

Mar. 17, 1983 [JP] Japan ................... 58-44767

[51] Int. Cl.[4] .............................. H04N 9/80
[52] U.S. Cl. ..................... 358/310; 358/12; 358/330; 360/9.1; 360/23
[58] Field of Search ............. 358/12, 14, 310, 330, 358/180, 224, 335, 10, 139, 319; 360/9.1, 23, 22, 37.1, 33.1, 31

[56] References Cited

U.S. PATENT DOCUMENTS

| | | | |
|---|---|---|---|
| 3,781,463 | 12/1973 | Bussebe | 358/310 |
| 4,163,247 | 7/1979 | Bock et al. | |
| 4,245,235 | 1/1981 | Poetsch | 358/14 |
| 4,335,393 | 6/1982 | Pearson | 358/12 |
| 4,530,004 | 7/1985 | Achika | 358/12 |

FOREIGN PATENT DOCUMENTS 2629706  1/1980  Fed. Rep. of Germany .
3107032 12/1981  Fed. Rep. of Germany .

OTHER PUBLICATIONS

German–Journal: "Fernseh–u.Kino–Technik," 33, No. 9, 1979, pp. 307–310.

Primary Examiner—Alan Faber
Attorney, Agent, or Firm—Andrus, Sceales, Starke & Sawall

[57] ABSTRACT

A color video signal transmitting apparatus comprises first and second input terminals supplied in parallel with a time base compressed luminance signal and a first time base compressed line-sequential color difference signal which are obtained from one or a plurality of pickup elements of a television camera by changing an effective horizontal scanning period of the one or a plurality of pickup elements to a predetermined short period, a circuit for producing a second time base compressed line-sequential color difference signal by time base compressing the signal from the second input terminal, a circuit for obtaining a multiplexed signal of a second synchronizing signal having a predetermined width and being in phase with a first synchronizing signal from a third input terminal and a discriminating signal of every two regular horizontal scanning periods which is used to discriminate either one of two kinds of time base compressed color difference signals which make up the second time base compressed line-sequential color difference signal, to produce a multiplexed signal in which the second synchronizing signal and the discriminating signal are multiplexed, a circuit for obtaining a time-division-multiplexed signal by time-division-multiplexing the time base compressed color difference signals, the time base compressed luminance signal, and the multiplexed signal, and a circuit for transmitting the time-division-multiplexed signal to a transmitting path.

8 Claims, 7 Drawing Figures

COLOR VIDEO SIGNAL TRANSMITTING APPARATUS

BACKGROUND OF THE INVENTION

The present invention generally relates to color video signal transmitting apparatuses, and more particularly to a color video signal transmitting apparatus supplied in parallel with a time base compressed luminance signal and a time base compressed line-sequential color difference signal which have the same time base compression rate and are obtained by shortening a horizontal scanning period of a television camera compared to a horizontal scanning period which is required to obtain a standard system video signal, for time-division-multiplexing a signal which is obtained by subjecting the time base compressed line-sequential color difference signal to a further time base compression with the time base compressed luminance signal and with a synchronizing signal which is generated independently, to transmit the time-division-multiplexed signal, and for transmitting the time-division-multiplexed signal so that a picture which is reproduced from the time-division-multiplexed signal can be monitored in an electronic viewfinder.

Among the existing color video signal recording and reproducing apparatuses such as video tape recorders (VTRs), the more popular recording and reproducing apparatuses separate a luminance signal and a carrier chrominance signal from a standard system composite color video signal. The standard system is a system such as the NTSC system, the PAL system, and the SECAM system. The separated luminance signal is frequency-modulated, and the separated carrier chrominance signal is frequency-converted into a low frequency range. The frequency converted carrier chrominance signal is frequency-division-multiplexed with the frequency modulated luminance signal and recorded on a recording medium. At the time of the reproduction, a signal processing opposite to the signal processing carried out at the time of the recording, is carried out to obtain a reproduced composite color video signal which is in conformance with the original standard system. In other words, the more popular recording and reproducing apparatuses employ the so-called low-band-conversion recording and reproducing system.

Other various recording and reproducing systems have been proposed besides the low-band-conversion recording and reproducing system. For example, there was a proposed recording and reproducing apparatus which was designed to subject two kinds of color difference signals which are obtained by frequency-demodulating the carrier chrominance signal to a time base compression, and also subject the luminance signal to a time base compression. According to this proposed recording and reproducing apparatus, the time base compressed signals are time-division-multiplexed, and the time division multiplexed signal is frequency-modulated and recorded on the recording medium. At the time of the reproduction, a signal processing opposite to the signal processing carried out at the time of the recording, is carried out to obtain a reproduced composite color video signal which is in conformance with the original standard system. An example of such a recording and reproducing apparatus may be found in the U.S. Pat. Nos. 3,781,463 and No. 4,245,235, for example. This proposed recording and reproducing apparatus takes into account the difference in the bands of the luminance signal and the color difference signals, and takes measures so that the color difference signals having the narrower band can be transmitted within the horizontal blanking period. In other words, one of the color difference signals which is transmitted within one horizontal scanning period (1H), is subjected to a time base compression into approximately 20% of 1H. In addition, to utilize the band effectively, the luminance signal is subjected to a time base compression into approximately 80% of 1H so as to occupy a band which is in the same range as the band of the time base compressed color difference signal, and transmitted. Further, the two color difference signals are time-division-multiplexed, as a line-sequential signal in which the two color difference signals are alternately transmitted for every 1H, with the time base compressed luminance signal. This time-division-multiplexed signal is supplied to a frequency modulator, and an output signal of the frequency modulator is recorded on the recording medium. At the time of the reproduction, a signal processing opposite to the signal processing carried out at the time of the recording, is carried out to obtain a reproduced composite color video signal. The recording and reproducing system employed in this proposed recording and reproducing apparatus, will hereinafter be referred to as a timeplex system.

According to the timeplex system which transmits the time-division-multiplexed signal, there is no duration in which the luminance signal and the color difference signal are transmitted simultaneously. In the case of the NTSC system color video signal and the PAL system color video signal, a mutual interference and moire may occur between the luminance signal and the color difference signals, because the luminance signal and the carrier chrominance signal are band-share-multiplexed and transmitted. However, such a mutual interference and moire will not occur according to the timeplex system. In addition, even when the color video signal of any one of the NTSC system, the PAL system, and the SECAM system is recorded by an azimuth recording and reproducing system on tracks having the horizontal synchronizing signals recorded in non-alignment between mutually adjacent tracks and then reproduced, there is substantially no crosstalk from the adjacent tracks due to the azimuth loss effect, and it is possible to obtain a reproduced picture of a high picture quality. This is because the time-division-multiplexed signal is recorded on the adjacent tracks in the form of a frequency modulated signal which is obtained by frequency-modulating by the time-division-multiplexed signal a high-frequency carrier which has a large azimuth loss effect.

The time base compressed luminance signal and the time base compressed color difference signal employed in the timeplex system, both have an energy distribution in which the energy is large in the low frequency range and the energy is small in the high frequency range. In other words, the time base compressed luminance signal and the time base compressed color difference signal assume a signal format which is suited for the frequency modulation. Thus, it is possible to obtain a large modulation index, and the signal-to-noise ratio can be greatly improved. Moreover, it is possible to substantially eliminate a deviation in the reproducing time base when expanding the time base.

When producing the time-division-multiplexed signal of the timeplex system described above according to the conventional method, the luminance signal and the carrier chrominance signal were separated from a standard system color video signal. The standard system is a system such as the NTSC, PAL, or SECAM system. The separated carrier chrominance signal was demodulated into two kinds of color difference signals. The separated luminance signal and the two kinds of color difference signals were independently subjected to a time base compression, and were then time-division-multiplexed. As is well known, the frequency band of the luminance signal is considerably wide compared to the frequency band of the color difference signals. Thus, according to the conventional method, memory circuits for subjecting the luminance signal to the time base compression and memory circuits for subjecting the time base compressed luminance signal to a time base expansion so as to return the time base compressed luminance signal to an original time base, had to have a large memory capacity. Further, a circuit part in the time base compressing system for time base compressing the signal to approximately 80% of the video duration, and a circuit part in the time base expanding system for time base expanding the signal back to the original time base, each required a pair of memory circuits which independently carried out the write-in operation and the read-out operation. As a result, there were problems in that the circuit construction became complex, and that the manufacturing cost of the circuit became high.

Another conventional method of producing the time-division-multiplexed signal of the timeplex system, is disclosed in a West German Published Patent Application No. P26 19 027.2. According to this other conventional method, the scanning of a pickup tube for obtaining the color information in a television camera, was performed within a horizontal blanking period of the scanning of a pickup tube for obtaining the luminance information, in order to obtain the time-division-multiplexed signal. However, according to this other conventional method, a deflection current waveform in the pickup tube for obtaining the color information in the television camera, had to be different from a deflection current waveform in the pickup tube for obtaining the luminance information. Consequently, there was a problem in that the construction of the circuit became complex.

SUMMARY OF THE INVENTION

Accordingly, it is a general object of the present invention to provide a novel and useful color video signal transmitting apparatus in which the problems described heretofore have been eliminated.

Another and more specific object of the present invention is to provide a color video signal transmitting apparatus comprising means for obtaining in parallel from one or a plurality of pickup elements of a television camera a time base compressed luminance signal and a first time base compressed line-sequential color difference signal which have been time base compressed with the same time base compression rate, by setting an effective horizontal scanning period of the one or a plurality of pickup elements to a predetermined period which is shorter than a regular horizontal scanning period at a time when the one or a plurality of pickup elements produce a standard system color video signal, time base compressing means supplied with the first time base compressed line-sequential color difference signal, for subjecting the first time base compressed line-sequential color difference signal to a further time base compression so as to produce a second time base compressed line-sequential color difference signal, and means for obtaining a time-division-multiplexed signal by performing a time-division-multiplexing so that two kinds of time base compressed color difference signals which make up the second time base compressed line-sequential color difference signal are alternately time-division-multiplexed for every one regular horizontal scanning period and so that one of the two kinds of time base compressed color difference signals, the time base compressed luminance signal, and a synchronizing signal which has been generated independently are time-division-multiplexed within one regular horizontal scanning period.

According to the apparatus of the present invention, memory circuits having a large memory capacity and circuits in the periphery thereof which were conventionally required for the time base compression of the luminance signal, may be omitted. In addition, the change in the effective horizontal scanning period of the one or a plurality of pickup elements is only approximately 20%, and only requires a simple change in the operation of a circuit which produces a deflection current in the pickup element. Moreover, the construction of the circuit will not become complex because the luminance information and the color information can be obtained from the one or a plurality of pickup elements with the same horizontal scanning period, and thus, the apparatus can be realized by inexpensive circuits. Further, because the luminance signal applied to the apparatus has already been subjected to the desired time base compression, it is unnecessary to pass the applied luminance signal for the purpose of time base compression through a time base compressing circuit which comprises a digital-to-analog converter, an analog-to-digital converter, a memory circuit and the like, and for this reason, the signal-to-noise ratio of the luminance signal can be improved. In addition, since the second time base compressed line-sequential color difference signal is obtained by subjecting the first time base compressed line-sequential color difference signal to a time base compression with a predetermined time base compression rate by using a memory circuit, the time base compression rate in the apparatus can be smaller than the time base compression rate which was required in the conventional apparatus, and the power consumption of the apparatus as a whole can consequently be reduced.

Still another object of the present invention is to provide a color video signal transmitting apparatus which further comprises means for displaying on an electronic viewfinder of the television camera a picture of at least a time base compressed luminance signal, in a time-division-multiplexed signal which is obtained through a transmission path, without time base expanding the time base compressed luminance signal. According to the apparatus of the present invention, it is possible to check the recorded time-division-multiplexed signal by the picture displayed on the electronic viewfinder. In addition, in a case where the time base compressed line-sequential color difference signal is modulated into a signal format which is the same as the signal format of a carrier chrominance signal within a predetermined standard system color video signal, without changing the time base, and is then passed through a signal processing circuit together with the time base compressed luminance signal to apply an output signal of this signal processing circuit to the electronic viewfinder, it is possible to display on the electronic view-passed through a switching circuit 13 which is connected to a terminal R and a lowpass filter 14. An output signal of the lowpass filter 14 is supplied to the switching circuit 15, a horizontal synchronizing signal separating circuit 16, a terminal P of a switching circuit 17, and a discriminating burst signal detector 18. At the time of the recording, the switching circuits 13 and 17 are connected to respective terminals R, in response to a signal from a control pulse generating device 20. Thus, at the time of the recording, the switching circuit 17 blocks the signal applied to the terminal P thereof from the lowpass filter 14. In addition, because an encoder 41 does not operate at the time of the recording, an output signal of the discriminating burst signal detector 18 is not used at the time of the recording.

At the same time, a first time base compressed line-sequential color difference signal b shown in FIG. 2(D) which has been time base compressed to 4/5, is supplied to an analog-to-digital (AD) converter 21 through the switching circuit 17. The first time base compressed line-sequential color difference signal b is subjected to an analog-to-digital conversion in the AD converter 21, and an output digital signal of the AD converter 21 is supplied to a memory circuit 22 wherein the time base of the digital signal is further time base, compressed to $\frac{1}{4}$. As a result, a digital line-sequential color difference signal which has been time base compressed to 1/5 in total, is obtained from the memory circuit 22. Further, a composite synchronizing signal c shown in FIG. 2(E) which is generated from a synchronizing signal generator (not shown) within the color television camera, is supplied to the control pulse generating device 20 through an input terminal 19. This synchronizing signal generator within the color television camera is known, and for example, an integrated circuit (IC) model HD44007 manufactured by Hitachi, Ltd. of Japan may be used for this synchronizing signal generator.

The control pulse generating device 20 has a construction shown in FIG. 4 which will be described later on in the specification. At the time of the recording, the control pulse generating device 20 uses the composite synchronizing signal c (including the horizontal and vertical synchronizing signals) from the input terminal 19, between the output signal of the horizontal synchronizing signal separating circuit 16 and the composite synchronizing signal c from the input terminal 19, and generates various control pulses (switching pulse, write-in and read-out clock pulses, and the like) based on a horizontal synchronizing signal within the composite synchronizing signal C. For example, the control pulse generating device 20 generates a horizontal synchronizing signal having a width of approximately 4 $\mu$s. In other words, the control pulse generating device 20 supplies to the memory circuit 22 a write-in clock pulse of 2.5 MHz, for example, to write into the memory circuit 22 a digital signal corresponding to one horizontal scanning period (1H) of one of the two kinds of time base compressed color difference signals which constitute the first time base compressed line-sequential color difference signal. Thereafter, after a predetermined time has elapsed from the time when this write-in to the memory circuit 22 is completed, the control pulse generating device 20 supplies to the memory circuit 22 a read-out clock pulse of 10 MHz, for example, to read out from the memory circuit 22 the written digital signal corresponding to 1H of one of the two kinds of color difference signals. Accordingly, a digital time base compressed signal of one of the two kinds of color difference signals, which has been time base compressed to $\frac{1}{4}$ (and time base compressed to 1/5 in total), is obtained from the memory circuit 22.

After the read-out from the memory circuit 22 is completed, the control pulse generating device 20 supplies a write-in clock pulse of 2.5 MHz to the memory circuit 22, to write into the memory circuit 22 a digital signal corresponding to 1H of the other of the two kinds of color difference signals. Further, after a predetermined time has elapsed from the time when this write-in to the memory circuit 22 is completed, the control pulse generating device 20 supplies a read-out clock pulse of 10 MHz to the memory circuit 22. Thereafter, similarly as in the case described above, the memory circuit 22 time base compresses the input digital signal to $\frac{1}{4}$, and thus produces a digital line-sequential color difference signal which has been time base compressed to 1/5 in total. This output time base compressed digital line-sequential color difference signal of the memory circuit 22, is supplied to a digital-to-analog (DA) converting circuit 23. As will be described later on in the specification in conjunction with FIG. 4, the DA converting circuit 23 comprises a latch gate 23a and a DA converter 23b. The DA converting circuit 23 is applied with a clock pulse of 10 MHz from the control pulse generating device 20, and subjects the time base compressed digital line-sequential color difference signal to a digital-to-analog conversion, so as to obtain a second time base compressed line-sequential color difference signal shown in FIG. 2(I) which has been time base compressed to 1/5 in total. This second time base compressed line-sequential color difference signal from the DA converting circuit 23, is supplied to a terminal 24a of a switching circuit 24.

A D.C. level (color reference level) of an achromatic color part in the first time base compressed line-sequential color difference signal, which is obtained from the control pulse generating device 20 by sampling and holding, is supplied to a terminal 24b of the switching circuit 24. In addition, the switching of the switching circuit 24 is controlled by an output pulse of the control pulse generating device 20, so that the switching circuit 24 is switched over and connected to the terminal 24a immediately after the termination of a duration in which the input D.C. level (color reference signal) is supplied to the terminal 24b. Hence, immediately after the color reference level, the switching circuit 24 selectively supplies to the switching circuit 15 through a lowpass filter 25, a signal in which the second time base compressed line-sequential color difference signal from the DA converting circuit 23 is time-division-multiplexed.

The switching circuit 15 is supplied with a multiplexed signal including the horizontal synchronizing signal shown in FIG. 2(G) having a width of approximately 4 $\mu$s and a discriminating burst signal shown in FIG. 2(H). This multiplexed signal is generated in the control pulse generating device 20, from the horizontal synchronizing signal and the discriminating burst signal which are generated in the control pulse generating device 20. The discriminating burst signal is used to discriminate the transmission lines of the color difference signals (B−Y) and (R−Y). For example, the discriminating burst signal has a single frequency of 1.6 MHz, for example, and is generated in the transmission line of only one (the color difference signal (R−Y) in this case) of the color difference signals (B−Y) and (R−Y), in correspondence with the duration in which the horizontal synchronizing signal is generated.

finder a color picture having a quality which is satisfactory from the practical point of view.

Other objects and further features of the present invention will be apparent from the following detailed description when read in conjunction with the accompanying drawings.

BRIEF DESCRIPTION OF THE DRAWINGS

FIGS. 2(A) through 2(M) show signal waveforms for explaining the operation of the block system shown in FIG. 1;

FIGS. 6(A) through 6(J) show signal waveforms for explaining the operation of the block systems shown in FIGS. 4 and 5.

DETAILED DESCRIPTION

Figure 1:
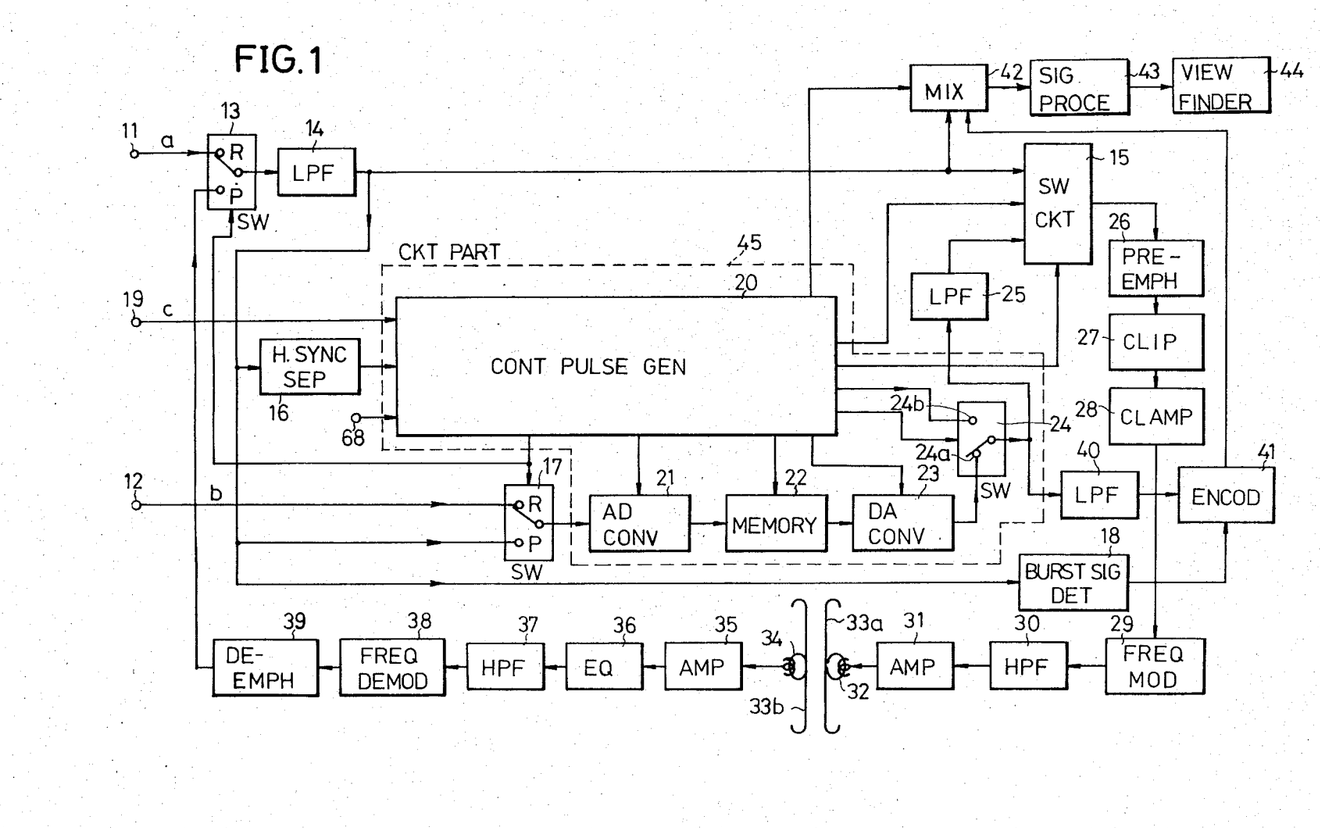
FIG. 1 is a systematic block diagram showing an embodiment of an essential part of a color video signal transmitting apparatus according to the present invention.

In FIG. 1, a time base compressed luminance signal which has been time base compressed to 4/5, for example, is applied to an input terminal 11. A first time base compressed line-sequential color difference signal which has been time base compressed with the same time base compression rate as the time base compressed luminance signal, that is, with a time base compression rate of 4/5, is applied to an input terminal 12. The time base compressed signals which are respectively applied to the input terminal 11 and 12 in parallel, are produced in the following manner. That is, a video signal related to a picture which is picked up by one or a plurality of pickup tubes of a general color television camera, is passed through a known signal processing circuit within the color television camera. Description will hereinafter be given for a case where the color television camera comprises a single pickup tube. This known signal processing circuit produces in parallel, a luminance signal, and a line-sequential color difference signal in which color difference signals (R−Y) and (B−Y), for example, are alternately multiplexed in line-sequence for every one horizontal scanning period (1H). An effective horizontal scanning period of the horizontal deflection current in the pickup tube is set to a scanning period which is shorter than the regular effective horizontal scanning period which is required to obtain a standard system video signal, and the horizontal scanning is performed so that a video duration of the output video signal becomes approximately 80%, for example, of the video duration of the standard system. Accordingly, the time base compressed luminance signal which has been time base compressed to 4/5, and the first time base compressed line-sequential color difference signal which has been time base compressed to 4/5, are respectively obtained from the color television camera and are supplied to the input terminals 11 and 12. The rate with which the effective horizontal scanning period of the pickup tube is shortened, is selected to a value so that it is possible to obtain a time base compressed luminance signal which has been time base compressed with the same time base compression rate as a time base compressed luminance signal within a time-division-multiplexed signal which is obtained from a switching circuit 15 which will be described later on in the specification.

The method of obtaining the time base compressed luminance signal and the like by setting the effective horizontal scanning period of the horizontal deflection current in the pickup tube of the color television camera to a scanning period which is shorter than the regular effective horizontal scanning period of the horizontal deflection current which is required to obtain the standard system video signal, is known from the West German Published Patent Application No. P26 19 027.2 described previously. However, it should be noted that the present invention is completely different from the above West German Published Patent Application, and the novel features of the present invention are as follows. That is, the effective horizontal scanning period of a first horizontal deflection current in a pickup element for obtaining the luminance signal, is selected to a scanning period so that it is possible to obtain a time base compression rate of a time base compressed luminance signal within a time-division-multiplexed signal which is to be obtained from the switching circuit 15 which will be described later on in the specification. Moreover, the effective horizontal scanning period of a second horizontal deflection current in a pickup element for obtaining the line-sequential color difference signal, is selected to a scanning period which is the same as the effective horizontal scanning period of the first horizontal deflection current. Accordingly, the present invention can also be applied to a single tube type color television camera, for example. In a case where the present invention is applied to the single tube type color television camera, when obtaining the time base compressed luminance signal and the time base compressed line-sequential color difference signal from the same pickup tube, the horizontal deflection current for obtaining the standard system video signal would assume a waveform having a period of 1H which is 64 μs as shown in FIG. 2(A) in which the effective horizontal scanning period is 52 μs and the horizontal blanking period is 12 μs. However, according to the present invention, the horizontal deflection current assumes a sawtooth waveform shown in FIG. 2(B) in which an effective horizontal scanning period $T_1$ is 41.6 μs and a horizontal blanking period $T_2$ is 22.4 μs.

Thus, the time base of the luminance signal and the line-sequential color difference signal which are obtained from the pickup tube, is time base compressed to 4/5 (=41.6 μs/52 μs) in correspondence with the effective horizontal scanning period of the horizontal deflection current. The period ($T_1 + T_2$) of the horizontal deflection current is 1H which is the same as the period (the regular horizontal scanning period) of the horizontal deflection current shown in FIG. 2(A).

The time base compressed luminance signal obtained from the pickup tube, has a signal waveform represented by a in FIG. 2(C), and includes no horizontal synchronizing signal and no ertical synchronizing signal. This time base compressed luminance signal a is The switching of the switching circuit 15 is controlled by a pulse from the control pulse generating device 20. Accordingly, the switching circuit 15 produces a time-division-multiplexed signal in which the multiplexed signal from the control pulse generating device 20, the output signal of the lowpass filter 25, and the output signal of the lowpass filter 14 are time-division-multiplexed in sequence within a duration of 1H. In other words, in a duration of a certain 1H, the output signal of the switching circuit 15 is a time-division-multiplexed signal including the horizontal synchronizing signal from the control pulse generating device 20, the output signal of the lowpass filter 25, and the output signal of the lowpass filter 14. On the other hand, in a duration of 1H which is immediately subsequent to the certain 1H, the output signal of the switching circuit 15 is a time-division-multiplexed signal including the multiplexed signal from the control pulse generating device 20, the output signal of the lowpass filter 25, and the output signal of the lowpass filter 14, where the horizontal synchronizing signal and the discriminating burst signal generated in the control pulse generating device 20 are multiplexed in the multiplexed signal from the control pulse generating device 20.

Figure 2:
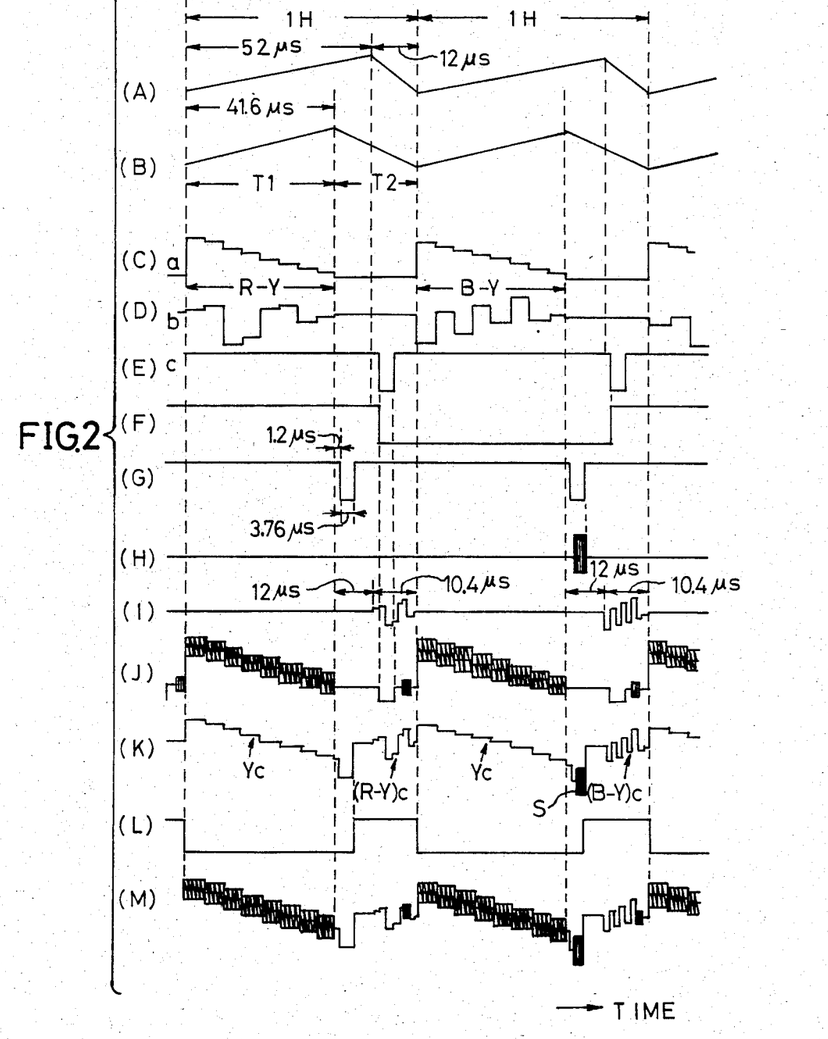
Figure 3:
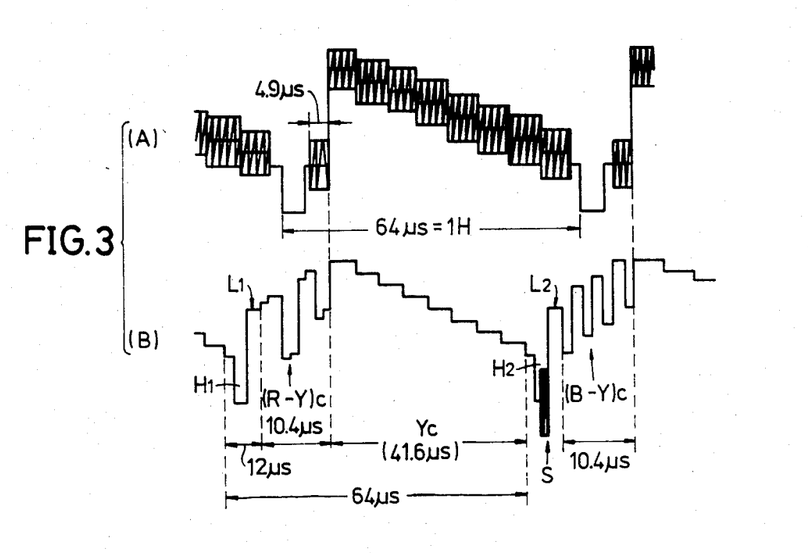
FIGS. 3(A) and 3(B) respectively show an example of a waveform of a color video signal which is to be transmitted by the color video signal transmitting apparatus according to the present invention, and an example of a waveform of a time-division-multiplexed signal at the time of the transmission.

When a SECAM system color video signal in the form of a color bar signal shown in FIG. 3(A) is to be transmitted, a time-division-multiplexed signal shown in FIGS. 2(K) and 3(B) is produced from the switching circuit 15. As shown in FIGS. 2(K) and 3(B), a discriminating burst signal S is multiplexed with a horizontal synchronizing signal $H_2$ for every 1H (=64 $\mu$s). In the time-division-multiplexed signal shown in FIG. 2, horizontal synchronizing signals $H_1$ and $H_2$, color reference levels $L_1$ and $L_2$ (the D.C. level of the achromatic color part of the respective color difference signals), the time base compressed color difference signals $(R-Y)_C$ and $(B-Y)_C$, and a time base compressed luminance signal $Y_C$, and the time base compressed luminance signal $Y_C$ is transmitted line-sequentially. This time-division-multiplexed signal shown in FIGS. 2(K) and 3(B) is passed through a known recording signal processing circuit in a video tape recorder (VTR), and recorded on a magnetic tape 33a by a recording head 32. The recording signal processing circuit comprises a pre-emphasis circuit 26, a white peak level clipping circuit 27, a clamping circuit 28, a frequency modulator 29, a highpass filter 30, and a recording amplifier 31.

According to the present embodiment of the invention, the scanning is performed so that the effective horizontal scanning period of the pickup tube is shorter than the regular effective horizontal scanning period which is required to obtain the standard system video signal, and this shorter effective horizontal scanning period is maintained constant. As a result, it is possible to obtain the time base compressed luminance signal and the time base compressed color difference signal from the same pickup tube. Therefore, the circuit construction within the television camera can be simplified compared to the circuit construction of the conventional apparatus. In addition, because the luminance signal which has been time base compressed with the desired time base compression rate can be obtained by the scanning performed in the television camera, it becomes unnecessary to provide a circuit for time base compressing the luminance signal which is obtained from the television camera. Consequently, the generation of noise which would occur during the analog-to-digital conversion and the digital-to-analog conversion when the luminance signal from the television camera must be time base compressed in the above circuit, is prevented according to the present embodiment. Furthermore, it is possible to reduce the power consumption of the apparatus.

FIG. 2(J) shows the waveform of a color video signal which is to be monitored, which color video signal is obtained from a mixing circuit 42 at the time of the recording.

Next, description will be given with respect to the operation of the apparatus shown in FIG. 1 at the time of the reproduction. At the time of the reproduction, the switching circuits 13 and 17 are connected to respective terminals P. A reproducing head 34 reproduces from a magnetic tape 33b, a signal which is identical to the signal which was recorded on the magnetic tape 33a at the time of the recording. The frequency modulated signal which is reproduced by the reproducing head 34, is passed through a known reproduced signal processing circuit, and formed into a reproduced time-division-multiplexed signal shown in FIG. 3(B). The reproduced signal processing circuit comprises a reproducing amplifier 35, an equalizer 36, a highpass filter 37, a frequency demodulator 38, and a de-emphasis circuit 39. The reproduced time-division-multiplexed signal is passed through the switching circuit 13 which is connected to the terminal P, and the lowpass filter 14. The output signal of the lowpass filter 14 is supplied to the switching circuit 15, the horizontal synchronizing signal separating circuit 16, and a discriminating burst signal detector 18. The output signal of the lowpass filter 14 is also supplied to the AD converter 21, through the switching circuit 17 which is connected to the terminal P.

A circuit part which is made up from the AD circuit 21, the memory circuit 22, and the DA converting circuit 23, writes into the memory circuit 22 the second time base compressed line-sequential color difference signal within the reproduced time-division-multiplexed signal, based on the output signals of the control pulse generating device 20. Then, this circuit part performs a read-out operation with respect to the memory circuit 22, so as to obtain the first time base compressed line-sequential color difference signal which has been time base compressed with the same time base compression rate as the time base compressed luminance signal. In other words, the second time base compressed line-sequential color difference signal is written into the memory circuit 22 by a write-in clock pulse of 10 MHz, for example, and the time base is expanded to 4 times and the digital signal of the first time base compressed line-sequential color difference signal is read out from the memory circuit 22 by a read-out clock pulse of 2.5 MHz. The digital signal which is read out from the memory circuit 22, is passed through the DA converting circuit 23 and is converted into a reproduced first time base compressed line-sequential color difference signal. This reproduced first time base compressed line-sequential color difference signal from the DA converting circuit 23, is supplied to the terminal 24a of the switching circuit 24. The color reference level (represented by $L_1$ and $L_2$ in FIG. 3(B)) which is obtained from the control pulse generating device 20 by sampling and holding, is supplied to the terminal 24b of the switching circuit 24. At the time of the reproduction, a pulse shown in FIG. 2(L) is applied to the switching circuit 24 as a switching pulse. The switching circuit 24 is switched and connected to the terminal 24b in a duration of 10.4 μs in which the second time base compressed line-sequential color difference signal is transmitted, and is otherwise connected to the terminal 24a. Accordingly, the reproduced first time base compressed line-sequential color difference signal shown in FIG. 2(D) in which the time base has been time base compressed to 4/5 and in which the color reference level has been added. This reproduced first time base compressed line-sequential color difference signal from the switching circuit 24, is supplied to a first input terminal of the encoder 41, through a lowpass filter 40. A discriminating burst signal of approximately 1.6 MHz is detected in the discriminating burst signal detector 18, and an output signal of the discriminating burst signal detector 18 is supplied to a second input terminal of the encoder 41.

The encoder 41 modulates the reproduced first time base compressed line-sequential color difference signal into a carrier chrominance signal which has the same signal format as the carrier chrominance signal within the desired standard system color video signal, without changing the time base of the reproduced first time base compressed line-sequential color difference signal. Thus, a carrier chrominance signal which has been time base compressed to 4/5, is produced from the encoder 41. The time base compressed carrier chrominance signal from the encoder 41 is supplied to the mixing circuit 42, and is mixed with the reproduced time-division-multiplexed signal shown in FIG. 2(K) which is obtained from the lowpass filter 14. The mixing circuit 42 produces a reproduced color video signal shown in FIG. 2(M) in which the time base has been time base compressed to 4/5, and supplies this reproduced time base compressed color video signal to a signal processing circuit 43. The signal processing circuit 43 itself is known. The signal processing circuit 43 processes the reproduced time base compressed color video signal into a signal format suited for being displayed as a picture on an electronic viewfinder 44 of the color television camera. The reproduced time base compressed color video signal is displayed as a color picture within the electronic viewfinder 44. In this case, a normal vertical and horizontal ratio can be obtained by slightly increasing the horizontal amplitude in the electronic viewfinder 44. The time base compression rate with which the reproduced time base compressed color video signal has been time base compressed, is such that the horizontal scanning period of the reproduced time base compressed color video signal only differs slightly from the horizontal scanning period of the standard system color video signal. Therefore, for the purpose of checking the video signal which is being recorded by monitoring the display on the electronic viewfinder 44, for example, the color picture displayed on the electronic viewfinder 44 is satisfactory from the practical point of view.

Next, a detailed description will be given with respect to the construction and operation of a circuit part 45 which is represented by a phantom line in FIG. 1, by referring to FIG. 4. FIG. 4 shows an embodiment of the circuit part 45, and those parts which are the same as those corresponding parts in FIG. 1 are designed by the same reference numerals. In FIG. 4, a signal from a recording and reproducing switch (not shown) is supplied to a recording and reproduction control circuit 51, through an input terminal 50. First, description will be given with respect to the operation of the circuit part 45 at the time of the recording. At the time of the recording, an output signal of the recording and reproduction control circuit 51 is supplied to the switching circuit 53 to switch and connect the switching circuit 53 to a terminal R. On the other hand, the output signal of the recording and reproduction control circuit 51 is supplied to the switching circuits 13 and 17 shown in FIG. 1, through a terminal 54, to switch and connect the switching circuits 13 and 17 to the respective terminals R.

Figure 4:
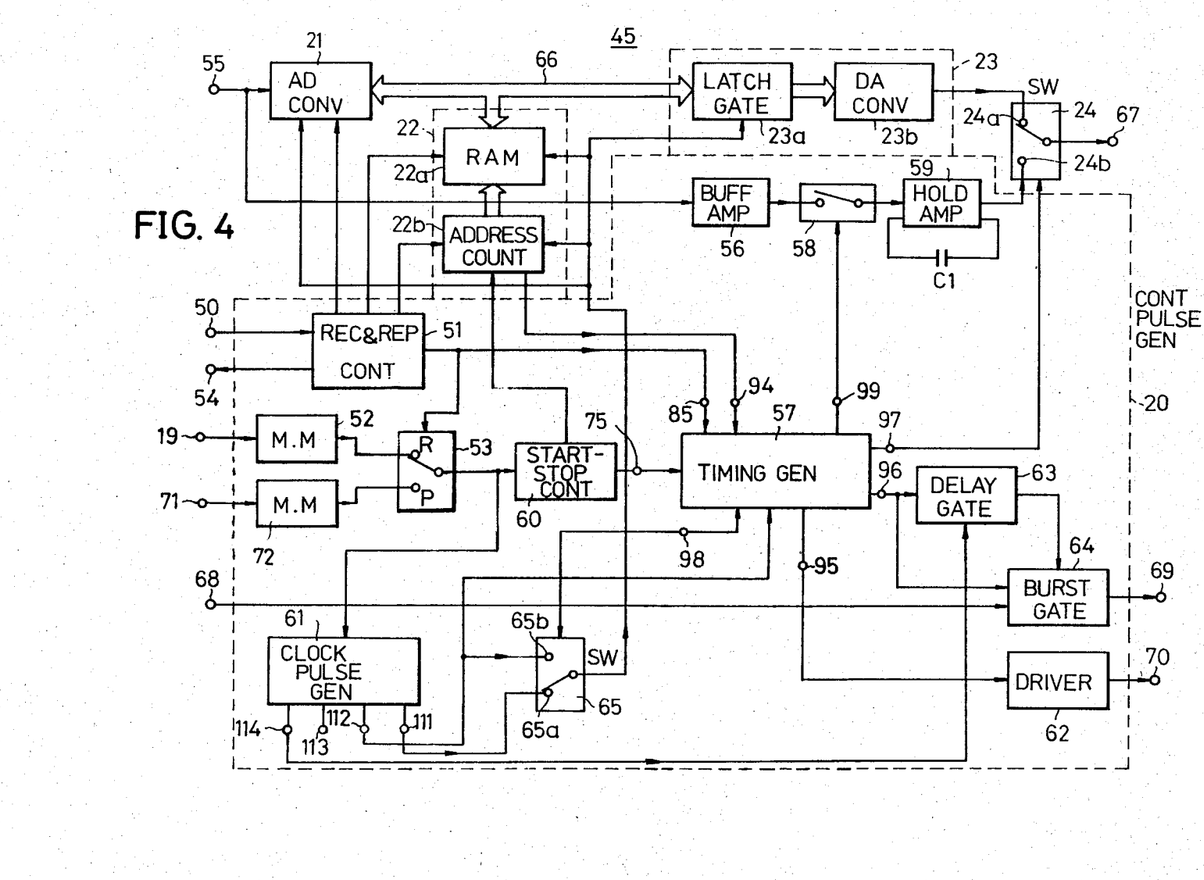
FIG. 4 is a systematic block diagram showing an embodiment of a circuit part in the block system shown in FIG. 1.

The first time base compressed line-sequential color difference signal from the switching circuit 17 described before, is supplied to the AD converter 21 and a buffer amplifier 56 shown in FIG. 4, through an input terminal 55. The first time base compressed line-sequential color difference signal obtained from the buffer amplifier 56, is supplied to a switching circuit 58. The switching of this switching circuit 58 is controlled by a switching signal from a timing generator 57. This switching pulse has a pulse width such that the pulse is positioned within the duration in which the color reference level is transmitted, and has a period of 1H. As a result, the color reference level within the first time base compressed line-sequential color difference signal is obtained for every 1H, from the switching circuit 58. The color reference level from the switching circuit 58 is held in a holding amplifier 59 which has a holding capacitor C1. Hence, a sampled and held voltage which corresponds to the D.C. level of the achromatic color part in the first time base compressed line-sequential color difference signal, is obtained from the holding amplifier 59 and is supplied to the terminal 24b of the switching circuit 24.

On the other hand, the composite synchronizing signal from the synchronizing signal generator (not shown) within the television camera, is supplied to a monostable multivibrator 52 through the input terminal 19, and is converted into a pulse which is in phase with the horizontal synchronizing signal within the composite synchronizing signal. The output pulse of the monostable multivibrator 52 is supplied to a start/stop control circuit 60 and a clock pulse generator 61, through the switching circuit 53. An output signal of the start/stop control circuit 60 is supplied to a counter within the timing generator 57, and to an address counter 22b so as to control the counting operation of the address counter 22b. The address counter 22b constitutes the memory circuit 22, together with a RAM 22a.

Figure 5:
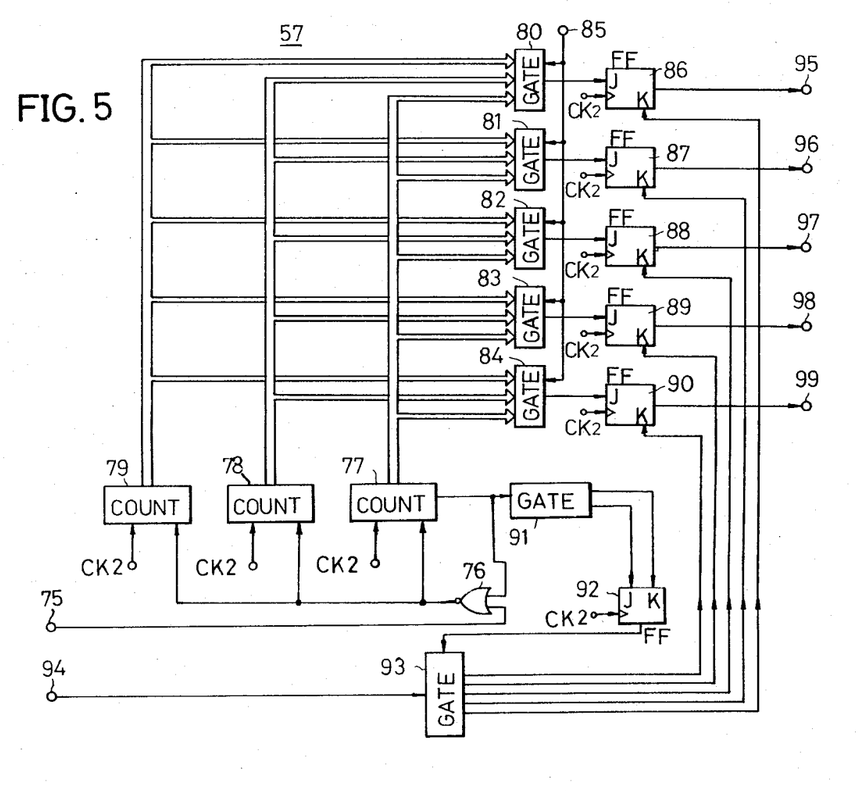
FIG. 5 is a systematic block diagram showing an embodiment of a timing generator in the block system shown in FIG. 4.

The timing generator 57 generates pulses for determining the timings of circuits within the control pulse generating device 20, and description will now be given with respect to the timing generator 57 by referring to FIG. 5. In FIG. 5, a pulse shown in FIG. 6(A) from the start/stop control circuit 60, is supplied to a NOR-circuit 76 through an input terminal 75. The NOR-circuit 76 performs a NOR operation between the pulse from the input terminal 75 and an output signal of a counter 77. An output signal of this NOR-circuit 76 is applied to counters 77, 78, and 79 as a reset pulse. A second clock pulse CK2 of 10 MHz, for example, is supplied to the counters 77 through 79 from the clock pulse generator 61. The counters 77 through 79 count the second clock pulse CK2. A counted value which is made up from output signals of the counters 77 through 79, indicates the most significant digit by the output signal of the counter 77 and indicates the least significant digit by the output signal of the counter 79. This counted value is supplied to gate circuits 80 through 84. The gate circuits 80 through 84 gate the signals at the counted value which is independently set for the recording and for the reproduction, by a signal which is applied to the gate circuits 80 through 84 from the recording and reproduction control circuit 51 through a terminal 85. The output signals of the gate circuits 80 through 84 are supplied to J terminals of respective J-K flip-flops 86 through 90.

The clock pulse CK2 described before, is applied to clock terminals of the J-K flip-flops 86 through 90. In addition, the output signal of the counter 77 is supplied to J and K terminals of a J-K flip-flop 92, through a gate circuit 91. The clock pulse CK2 is applied to a clock terminal of the J-K flip-flop 92. An output signal of the J-K flip-flop 92 is supplied to a gate circuit 93. A pulse shown in FIG. 6(B) from the address counter 22b, which indicates the completion of the count, is supplied to the gate circuit 93 through an input terminal 94. The gate circuit 93 gates and supplies this pulse from the input terminal 94 to K terminals of the J-K flip-flops 86 through 90, as a clear pulse, based on the output signal of the J-K flip-flop 92.

Figure 6:
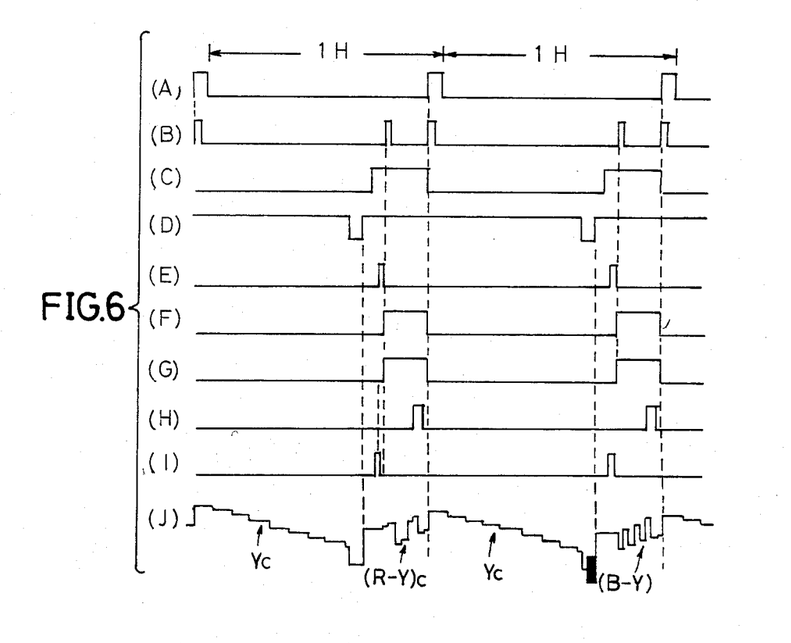

Accordingly, the J-K flip-flop 86 produces a pulse shown in FIG. 6(C) through a terminal 95, and supplies this pulse to a driver 62 shown in FIG. 4. The J-K flip-flop 87 produces through a terminal 96, a pulse shown in FIGS. 6(D) and 2(G) having a width of approximately 4 μs, as the horizontal synchronizing signal. This horizontal synchronizing signal is supplied to a delay gate circuit 63 and to a burst gate circuit 64 shown in FIG. 4. The J-K flip-flop 88 produces a pulse shown in FIG. 6(E) through a terminal 97, at the time of the recording. At the time of the reproduction, the J-K flip-flop 88 produces a pulse shown in FIGS. 6(F) and 2(L) through the terminal 97, and this pulse is applied to the switching circuit 24 as a switching pulse. Further, the J-K flip-flop 89 produces a pulse shown in FIG. 6(G) through a terminal 98, and supplies this pulse to a switching circuit 65 shown in FIG. 4, as a switching pulse. At the time of the recording, the J-K flip-flop 90 produces a pulse shown in FIG. 6(H) through a terminal 99. The J-K flip-flop 90 produces a pulse shown in FIG. 6(I) through the terminal 99, at the time of the reproduction. The output pulse of the J-K flip-flop 90 is supplied to the switching circuit 58 through the terminal 99, as a switching pulse, and turns the switching circuit 58 ON only for a duration in which this switching pulse assumes a high level. FIG. 6(J) shows the waveform of the time-division-multiplexed signal which is to be recorded, and this waveform is the same as the waveform of the signal shown in FIG. 2(K).

Figure 7:
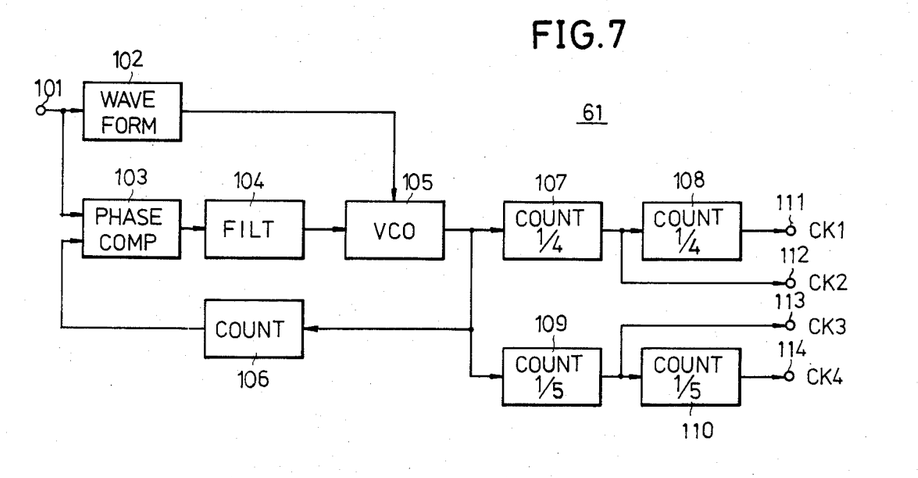
FIG. 7 is a systematic block diagram showing an embodiment of a clock pulse generator in the block system shown in FIG. 4.

The clock pulse generator 61 shown in FIG. 4, has a construction shown in FIG. 7. The signal from the switching ircuit 53 shown in FIG. 4, is applied to an input terminal 101 shown in FIG. 7. The signal from the input terminal 101 is supplied to a wave forming circuit 102 and to a phase comparator 103. The phase comparator 103, a filter 104, a voltage controlled oscillator (VCO) 105, and a counter 106 constitute a known phase locked loop (PLL). The VCO 105 in this PLL produces a signal which has a frequency of 40 MHz, for example, and is in phase with the horizontal synchronizing signal, because the VCO 105 is reset by an edge (coincides with the rising edge of the horizontal synchronizing signal) of the output signal of the wave forming circuit 102. The response frequency of the PLL is set so that the PLL can sufficiently follow the time base deviation in the horizontal synchronizing signal which is reproduced in the recording and reproducing apparatus. This measure is taken because, in a case where the sampling does not always start with the same timing when performing the compression and expansion of the time base, the color irregularity will occur proportionally to the expansion rate with which the deviation at the time of the compression is expanded. In addition, when the PLL does not sufficiently follow the time base deviation in the reproduced horizontal synchronizing signal, the color difference signals and the luminance signal will deviate on the reproduced picture, due to the difference in the time base compression rate of the time base compressed luminance signal and the time base compressed line-sequential color difference signal, and the like.

The output signal of the VCO 105 is frequency-divided by ¼ in a counter 107, and is further frequency-divided by 1/5 in a counter 108. The counter 107 produces the second clock pulse CK2 through a terminal 112. On the other hand, the counter 108 produces a first clock pulse CK1 through a terminal 111. At the same time, the output signal of the VCO 105 is frequency-divided by 1/5 in a counter 109, and is further frequency-divided by 1/5 in a counter 110. The counter 109 produces a third clock pulse CK3 through a terminal 113, and the counter 110 produces a fourth clock pulse CK4 through a terminal 114. The frequency of the output signal of the VCO 105 is 40 MHz, for example. Accordingly, the frequencies of the clock pulses CK1, CK2, CK3, and CK4 respectively are 2 MHz, 10 MHz, 8 MHz, and 1.6 MHz. At the time of the recording, a fifth clock pulse CK5 which is obtained through the switching circuit 65, has a repetition frequency of 2 MHz which is equal to the frequency of the first clock pulse CK1.

Returning now to the description of FIG. 4, the line-sequential color difference signal is subjected to an analog-to-digital conversion in the AD converter 21, based on the fifth clock pulse CK5 of 2 MHz. For example, the line-sequential color difference signal is converted into a digital line-sequential color difference signal having a quantization number of 6 bits for one picture element. This digital line-sequential color difference signal from the AD converter 21 is supplied to the RAM 22a, through a bi-directional data bus 66. This RAM 22a and the address counter 22b are supplied with the fifth clock pulse CK5 of 2 MHz, and the digital time base compressed line-sequential color difference signal is written into the RAM 22a at an address which is designated by the address counter 22b.

When the RAM 22a completes the write-in of the color difference signal (R−Y) or (B−Y) of the video duration of 52 μs, the RAM 22a is controlled by an output signal of the recording and reproduction control circuit 51 so that a read-out operation is started after approximately 12 μs has elapsed. Moreover, the switching circuit 65 is switched over by the pulse shown in FIG. 6(G) and is connected to a terminal 65b, so as to produce the second clock pulse CK2 as the fifth clock pulse CK5. Thus, after the above duration of approximately 12 μs has elapsed, the written color difference signal is read out from the RAM 22a by the clock pulse of 10 MHz. Accordingly, the digital color difference signal which has been time base compressed to ¼ and therefore time base compressed to 1/5 in total, is obtained from Ithe RAM 22a and is applied to the terminal 24a of the switching circuit 24, through the latch gate 23a which is applied with the fifth clock pulse CK5 and the DA converter 23b. At the time of the recording, the pulse shown in FIG. 6(E) is supplied to the switching circuit 24 from the timing generator 57 through the terminal 97, and the switching circuit 24 passes the input signal to the terminal 24a thereof for a duration in which the supplied pulse assumes a high level. The switching circuit 24 passes the input signal to the terminal 24b thereof for a duration in which the supplied pulse assumes a low level.

Accordingly, a time base compressed line-sequential color difference signal shown in FIG. 2(I) is selectively produced from the switching circuit 24, through an output terminal 67. In the time base compressed line-sequential color difference signal shown in FIG. 2(I), the D.C. level of the achromatic part of the color difference signal is transmitted for approximately 1.6 μs, and immediately thereafter, one of the color difference signals having a duration of 52 μs is time base compressed to 1/5 and transmitted for 10.4 μs. Further, the time base compressed color difference signals are transmitted line-sequentially. According to the present embodiment, the D.C. level of the achromatic color part is obtained by the sampling and holding, and the sampled and held D.C. level of the achromatic color part is selectively produced from the switching circuit 24. As a result, even when the time base compression is not started from the achromatic color part, it is possible to obtain an output which is substantially the same as the time base compressed output of the achromatic color part. Therefore, according to the present embodiment, it is possible to greatly reduce the required memory capacity of the RAM 22a, compared to the case where the time base compression is started from the achromatic color part. In addition, it is possible to transmit the D.C. level of the achromatic color part in the line-sequential color difference signal with a high precision, without introducing an error which would occur when the D.C. level of the achromatic color part in the line-sequential color difference signal is processed digitally.

On the other hand, the timing generator 57 generates a pulse shown in FIG. 6(D) immediately after the video duration. This pulse has a width of approximately 4 μs, and has a period of 1H. The timing generator 57 supplies this pulse to the burst gate circuit 64 and to the delay gate circuit 63, through the terminal 96. The delay gate circuit 63 delays the fourth clock pulse CK4 of 1.6 MHz by a predetermined delay time, based on the pulse which is supplied thereto from the timing generator 57 through the terminal 96. Thus, the fourth clock pulse CK4 of 1.6 MHz is produced from the delay gate circuit 63 as a burst signal, and is supplied to the burst gate circuit 64. As a result, the burst gate circuit 64 produces the pulse shown in FIG. 6(D) from the timing generator 57, and produces the burst signal only for a duration in which the pulse shown in FIG. 6(D) assumes a low level. Further, the burst gate circuit 64 is also supplied with a symmetrical square wave shown in FIG. 2(F) which has a period of 2H, through an input terminal 68. For example, this symmetrical square wave is obtained by frequency-dividing by ½ the horizontal synchronizing signal which is obtained from the synchronizing signal generator (not shown) within the television camera. Accordingly, the burst gate circuit 64 produces a signal in which the burst signal is multiplexed, with a period of 2H, within a part of the pulse shown in FIG. 6(D) in a low-level duration of the pulse. The output signal of the burst gate circuit 64 is supplied to the switching circuit 15 shown in FIG. 1, through an output terminal 69.

When the fourth clock pulse CK4 is gated for every other 1H by the pulse which is obtained from the timing generator 57 through the terminal 96 and has the width of approximately 4 μs, the edge of the pulse which is produced as the horizontal synchronizing signal becomes distorted due to the phase of the fourth clock pulse CK4 and the like. The delay gate circuit 63 prevents the picture quality of the reproduced picture from becoming deteriorated by such a jitter.

The output signal shown in FIG. 6(C) of the timing generator 57, is supplied to the driver 62 which produces a signal shown in FIG. 2(L) through an output terminal 70. The signal shown in FIG. 2(L) is produced as a switching pulse which assumes a low level in correspondence with the duration in which the time base compressed luminance signal shown in FIG. 2(C) is transmitted. The switching pulse produced through the output terminal 70 is supplied to the switching circuit 15 shown in FIG. 1.

Next, description will be given with respect to the operation at the time of the reproduction. At the time of the reproduction, the switching circuits 13, 17, and 53 are switched over and connected to respective terminals P by the signal described before from the recording and reproduction control circuit 51. The reproduced time-division-multiplexed signal shown in FIG. 2(K) is applied to the input terminal 55 shown in FIG. 4, through the lowpass filter 14 shown in FIG. 1. The reproduced time-division-multiplexed signal applied to the input terminal 55, is supplied to the AD converter 21 and to the buffer amplifier 56. The reproduced horizontal synchronizing signal from the horizontal synchronizing signal separating circuit 16, which is applied to an input terminal 71 shown in FIG. 4, is supplied to a monostable multivibrator 72, and is subjected to a wave-shaping in the monostable multivibrator 72. An output pulse of the monostable multivibrator 72 is supplied to the clock pulse generator 61 through the switching circuit 53. The clock pulse generator 61 generates the four kinds of clock pulses CK1, CK2, CK3, and CK4 described before.

The switching of the switching circuit 65 is controlled by the switching pulse shown in FIG. 6(G) which is generated from the timing generator 57 and applied to the switching circuit 65 through the terminal 98. The switching circuit 65 is switched over and connected to the terminal 65b and selectively passes the second clock pulse CK2, for a duration in which the switching pulse shown in FIG. 6(G) assumes a high level. On the other hand, the switching circuit 65 is switched over and connected to a terminal 65a and selectively passes the first clock pulse CK1, for a duration in which the switching pulse shown in FIG. 6(G) assumes a low level. At the time of the reproduction, the RAM 22a is controlled to perform the write-in operation for a duration in which the switching circuit 65 produces the second clock pulse CK2, and to perform the read-out operation for a duration in which the switching circuit 65 produces the first clock pulse CK1. Accordingly, a digital time base compressed line-sequential color difference signal which has been time base expanded to 4/1, and therefore having the time base thereof time base compressed to 4/5, is obtained from the RAM 22a and supplied to the latch gate 23a wherein the digital time base compressed line-sequential color difference signal is latched. The output digital signal of the latch gate 23a is supplied to the terminal 24a of the switching circuit 24 through the DA converter 23b.

On the other hand, at the time of the reproduction, the switching of the switching circuit 58 is controlled by the switching pulse shown in FIG. 6(I) which is generated from the timing generator 57 and applied to the switching circuit 58 through the terminal 99. As shown in FIG. 6(I), this switching pulse assumes a high level only for a duration in which the color reference level of the reproduced time-division-multiplexed signal is transmitted. As a result, the switching circuit 58 only passes the color reference level of the reproduced time-division-multiplexed signal, and supplies this color reference level to the holding amplifier 59. Hence, a voltage which is obtained by holding the color reference level of the reproduced time-division-multiplexed signal, is applied to the terminal 24b of the switching circuit 24. At the time of the reproduction, the switching circuit 24 is switched over and connected to the terminal 24b for a duration in which the time base compressed color difference signal within the reproduced time-division-multiplexed signal is transmitted, so as to selectively produce the above sampled and held voltage, by the switching pulse shown in FIG. 6(F). Otherwise, the switching circuit 24 is switched over and connected to the terminal 24a, so as to selectively produce the output signal of the DA converter 23b. Accordingly, the first time base compressed line-sequential color difference signal in which the color reference level has been added as shown in FIG. 2(D), is obtained through the output terminal 67. This first time base compressed line-sequential color difference signal from the output terminal 67 is supplied to the encoder 41 shown in FIG. 1 through the lowpass filter 40.

The present invention is of course not limited to the embodiment described heretofore. For example, only the time base compressed luminance signal may be applied to the electronic viewfinder within the television camera, without subjecting the time base compressed luminance signal to a time base expansion, so as to display a black-and-white picture on the electronic viewfinder. In this case, the discriminating burst signal detector 18 and the encoder 41 become unnecessary, and for this reason, the construction of the circuit can be simplified. In addition, instead of employing the pickup tube, the television camera may employ a solid-state image sensor such as a charge-coupled device (CCD). In other words, the television camera may be the so-called solid-state color camera.

The discriminating signal for discriminating either one of the color difference signals, is not limited to the burst signal employed in the embodiment described heretofore. For example, the discrimination may also be made by changing the pulse width of the horizontal synchronizing pulse for every 2H, or the pedestal level may be changed with a period of 2H. Moreover, the transmitting duration of a D.C. signal which has a predetermined level and is added immediately prior to the two kinds of time base compressed color difference signals, may be alternately changed for every 1H.

Further, the present invention is not limited to these embodiments, but various variations and modifications may be made without departing from the scope of the present invention.

What is claimed is:

1. A color video signal transmitting apparatus comprising:

first and second input terminals supplied in parallel with a time base compressed luminance signal and a first time base compressed line-sequential color difference signal which have been time base compressed with the same time base compression rate and are obtained from one or a plurality of pickup elements of a television camera, said time base compressed luminance signal and said first time base compressed line-sequential color difference signal being obtained from said one or a plurality of pickup elements by changing an effective horizontal scanning period of said one or a plurality of pickup elements to a predetermined scanning period which is shorter than an effective horizontal scanning period which is required to obtain a standard system video signal;

time base compressing means supplied with said first time base compressed line-sequential color difference signal through said second input terminal, for subjecting said first time base compressed line-sequential color difference signal to a further time base compression so as to produce a second time base compressed line-sequential color difference signal;

a third input terminal supplied with a first synchronizing signal from a synchronizing signal generator within said television camera;

signal generating circuit means for obtaining, in phase with said first synchronizing signal which is supplied thereto through said third input terminal, a second synchronizing signal which has a predetermined width, and for obtaining for every two regular horizontal scanning periods a discriminating signal which is used to discriminate either one of two kinds of time base compressed color difference signals which make up said second time base compressed line-sequential color difference signal, to produce a multiplexed signal in which said second synchronizing signal and said discriminating signal are multiplexed;

time-division-multiplexed signal obtaining means supplied with said time base compressed luminance signal, said second time base compressed line-sequential color difference signal, and said multiplexed signal, for obtaining a time-division-multiplexed signal, said time-division-multiplexed signal being obtained by performing a time-division-multiplexing in which said two kinds of time base compressed color difference signals are alternately time-division-multiplexed for every one regular horizontal scanning period and in which one of said two kinds of time base compressed color difference signals, said time base compressed luminance signal, and said multiplexed signal are time-division-multiplexed within one regular horizontal scanning period;

transmitting means for transmitting said time-division-multiplexed signal from said time-division-multiplexed signal obtaining means to a transmitting path;

reproducing means for reproducing said time-division-multiplexed signal which is obtained through said transmitting path;

signal processing circuit means for processing at least said time base compressed luminance signal within the reproduced time-division-multiplexed signal from said reproducing means into a signal format suited for display of a picture without subjecting said time base compressed luminance signal to a time base expansion; and an electronic viewfinder supplied with an output signal of said signal processing circuit means for at least displaying a picture of said time base compressed luminance signal.

2. A color video signal transmitting apparatus as claimed in claim 1 in which said electronic viewfinder is located in the television camera.

3. A color video signal transmitting apparatus as claimed in claim 2 in which said transmitting path is constituted by a recording medium, said transmitting means at least comprising a frequency modulator and a recording head for recording an output signal of said frequency modulator on said recording medium, said reproducing means at least comprising a reproducing head for reproducing the recorded signal from said recording medium and a demodulator for demodulating a reproduced frequency modulated signal which is obtained from said reproducing head.

4. A color video signal transmitting apparatus as claimed in claim 1 which further comprises time base expanding means for subjecting said second time base compressed line-sequential color difference signal within the reproduced time-division-multiplexed signal from said reproducing means to a time base expansion so as to obtain said first time base compressed line-sequential color difference signal, encoder means supplied with said first time base compressed line-sequential color difference signal from said time base expanding means and said discriminating signal within said reproduced time-division-multiplexed signal for producing a time base compressed carrier chrominance signal, said signal processing circuit means obtaining a mixed signal by mixing said time base compressed carrier chrominance signal from said encoder means and said reproduced time-division-multiplexed signal from said reproducing means, and an electronic viewfinder supplied with an output signal of said signal processing circuit means for displaying a color picture of said time base compressed luminance signal and said time base compressed carrier chrominance signal.

5. A color video signal transmitting apparatus as claimed in claim 4 in which said time base compressing means and said time base expanding means respectively have digital memory circuit means, a switching circuit being coupled to an input stage of said digital memory circuit means, said switching circuit selectively producing one of said first time base compressed line-sequential color difference signal and said reproduced time-division-multiplexed signal.

6. A color video signal transmitting apparatus as claimed in claim 1 in which said discriminating signal is a burst signal which is multiplexed with said second synchronizing signal for every two regular horizontal scanning periods.

7. A color video signal transmitting apparatus as claimed in claim 1 in which said discriminating signal is a D.C. signal which has a predetermined level and is added immediately prior to said two kinds of time base compressed color difference signals, and a transmitting duration of said D.C. signal is alternately changed for every one regular horizontal scanning period.

8. A color video signal transmitting apparatus as claimed in claim 1 in which said time base compressed luminance signal and said first time base compressed line-sequential color difference signal have been time base compressed to 4/5, and said second time base compressed line-sequential color difference signal is time base compressed to 1/5.

* * * * *